United States Patent
Shinohara

(10) Patent No.: US 7,936,989 B2
(45) Date of Patent: May 3, 2011

(54) IMAGE CAPTURING APPARATUS

(75) Inventor: Junichi Shinohara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 688 days.

(21) Appl. No.: 11/581,113

(22) Filed: Oct. 16, 2006

(65) Prior Publication Data
US 2007/0086772 A1 Apr. 19, 2007

(30) Foreign Application Priority Data

Oct. 18, 2005 (JP) ................... 2005-303077

(51) Int. Cl.
*G03B 7/00* (2006.01)
(52) U.S. Cl. .......................................... 396/241
(58) Field of Classification Search ............ 396/241
See application file for complete search history.

(56) References Cited

U.S. PATENT DOCUMENTS

| | | | |
|---|---|---|---|
| 5,192,860 A | 3/1993 | Shinohara et al. | |
| 5,192,964 A | 3/1993 | Shinohara et al. | |
| 5,309,190 A | 5/1994 | Shinohara et al. | |
| 5,682,563 A | 10/1997 | Shinohara et al. | |
| 6,885,819 B2 | 4/2005 | Shinohara | |
| 7,113,318 B2* | 9/2006 | Onuki et al. | 359/234 |
| 7,365,791 B2* | 4/2008 | Ikeda | 348/363 |
| 2002/0126210 A1 | 9/2002 | Shinohara et al. | |
| 2003/0231291 A1 | 12/2003 | Kitajima et al. | |
| 2004/0100561 A1 | 5/2004 | Shinohara et al. | |
| 2004/0240871 A1 | 12/2004 | Shinohara et al. | |
| 2004/0263633 A1 | 12/2004 | Shinohara et al. | |
| 2005/0012846 A1 | 1/2005 | Shinohara | |
| 2005/0068638 A1 | 3/2005 | Nuno et al. | |
| 2007/0065135 A1* | 3/2007 | Takei et al. | 396/241 |

FOREIGN PATENT DOCUMENTS

| | | |
|---|---|---|
| JP | 05-323264 | 12/1993 |
| JP | 2001/128042 | 5/2001 |
| JP | 2001/222039 | 8/2001 |
| JP | 2003/134393 | 5/2003 |
| JP | 2005/037770 | 2/2005 |
| JP | 2006/119546 | 5/2006 |

* cited by examiner

*Primary Examiner* — W. B. Perkey
(74) *Attorney, Agent, or Firm* — Dickstein Shapiro LLP

(57) ABSTRACT

An image capturing apparatus includes an optical unit for forming an image of a subject, a first light extinction unit present on an optical axis of the optical unit and configured to adjust an amount of light by changing a dimension of a aperture stop thereof, a second light extinction unit to be present on said optical axis of the optical unit and configured to adjust an amount of light passing therethrough by changing a transmittance of the light, and a controller for controlling operations of said first and second light extinction units so as to make an exposure optimum at a time of photographing. The controller has precedence on the adjustment of the light amount with the first light extinction unit until a predetermined aperture stop diameter and has precedence on the adjustment of the light amount with the second light extinction unit in a state that the light is to be reduced beyond a state in the predetermined aperture stop diameter, thereby attaining optimization of the exposure.

10 Claims, 16 Drawing Sheets

FIG. 5

| | NO ND FILTER INSERTED | | | ND FILTER INSERTED | |
|---|---|---|---|---|---|
| | F VALUE | AV VALUE | | F VALUE | AV VALUE |
| ① | F2.5 | 2.644 | ①+ND | F5.0 | 4.644 |
| ② | F2.8 | 2.977 | ②+ND | F5.6 | 4.977 |
| ③ | F3.1 | 3.311 | ③+ND | F6.3 | 5.311 |
| ④ | F3.5 | 3.644 | ④+ND | F7.1 | 5.644 |
| ⑤ | F4.0 | 3.977 | ⑤+ND | F8 | 5.977 |
| ⑥ | F4.5 | 4.311 | ⑥+ND | F9 | 6.311 |
| ⑦ | F5.0 | 4.644 | ⑦+ND | F10 | 6.644 |
| ⑧ | F5.6 | 4.977 | ⑧+ND | F11 | 6.977 |
| ⑨ | F6.3 | 5.311 | ⑨+ND | F13 | 7.311 |
| ⑩ | F7.1 | 5.644 | ⑩+ND | F14 | 7.644 |
| ⑪ | F8 | 5.977 | ⑪+ND | F16 | 7.977 |
| ⑫ | F9 | 6.311 | ⑫+ND | F18 | 8.311 |

| | |
|---|---|
| F VALUE AT TIME OF "RELEASED" | 2.5 |
| AV VALUE AT TIME OF "RELEASED" | 2.64 |
| ΔAV | 0.3333 |
| PRESUMED ND | 2 |

SHADED FRAME:
AREA WHERE STATE WITH NO ND FILTER INSERTED OVERLAPS THAT WITH ND FILTER INSERTED

FIG. 7

| | IMAGE PERFORMANCE (MTF) | DEPTH OF SUBJECT FIELD | GHOST IMAGE | PERIPHERAL LIGHT AMOUNT | POWER CONSUMPTION (*) |
|---|---|---|---|---|---|
| LIGHT EXTINCTION BY CONTROL OF APERTURE (MULTISTAGE DIAPHRAGM) | IF TOO MUCH THROTTLED, MTF DECREASES. | ○ DEPTH INCREASES IF LIGHT IS REDUCED BY THROTTLING. | ○ GHOST CAN BE REDUCED BY THROTTLING APERTURE STOP. | ○ REDUCTION IN PERIPHERAL LIGHT AMOUNT CAN BE MITIGATED BY THROTTLING. | ×× POWER CONSUMPTION IS LARGE BECAUSE PULSE MOTOR IS USED. |
| ND FILTER LIGHT EXTINCTION SYSTEM | △ MTF BEFORE INSERTION OF ND FILTER IS FUNDAMENTALLY MAINTAINED. | △ DEPTH DOES NOT CHANGE IF LIGHT IS REDUCED | × GHOST MAY BE INCREASED BY FRONT AND REAR FACES OF ND FILTER. | △ PERIPHERAL LIGHT AMOUNT IS NOT IMPROVED BY REDUCING LIGHT | × POWER CONSUMPTION IS SMALL AS COMPARED WITH CASE OF PULSE MOTOR. |

○ : IMPROVED AS COMPARED WITH BEFORE REDUCTION IN LIGHT
△ : IDENTICAL WITH THAT BEFORE REDUCTION IN LIGHT
× : DAMAGED AS COMPARED WITH BEFORE REDUCTION IN LIGHT
* ALTHOUGH POWER CONSUMPTION DIFFERS DEPENDING UPON DRIVING SYSTEM, ORDINARY CONFIGURATIONS: PULSE MOTOR FOR DIAPHRAGM AND MOVING MAGNET FOR INSERTION/ REMOVAL ARE CONSIDERED IN ABOVE TABLE. OF ND FILTER ARE CONSIDERED IN THE ABOVE TABLE.

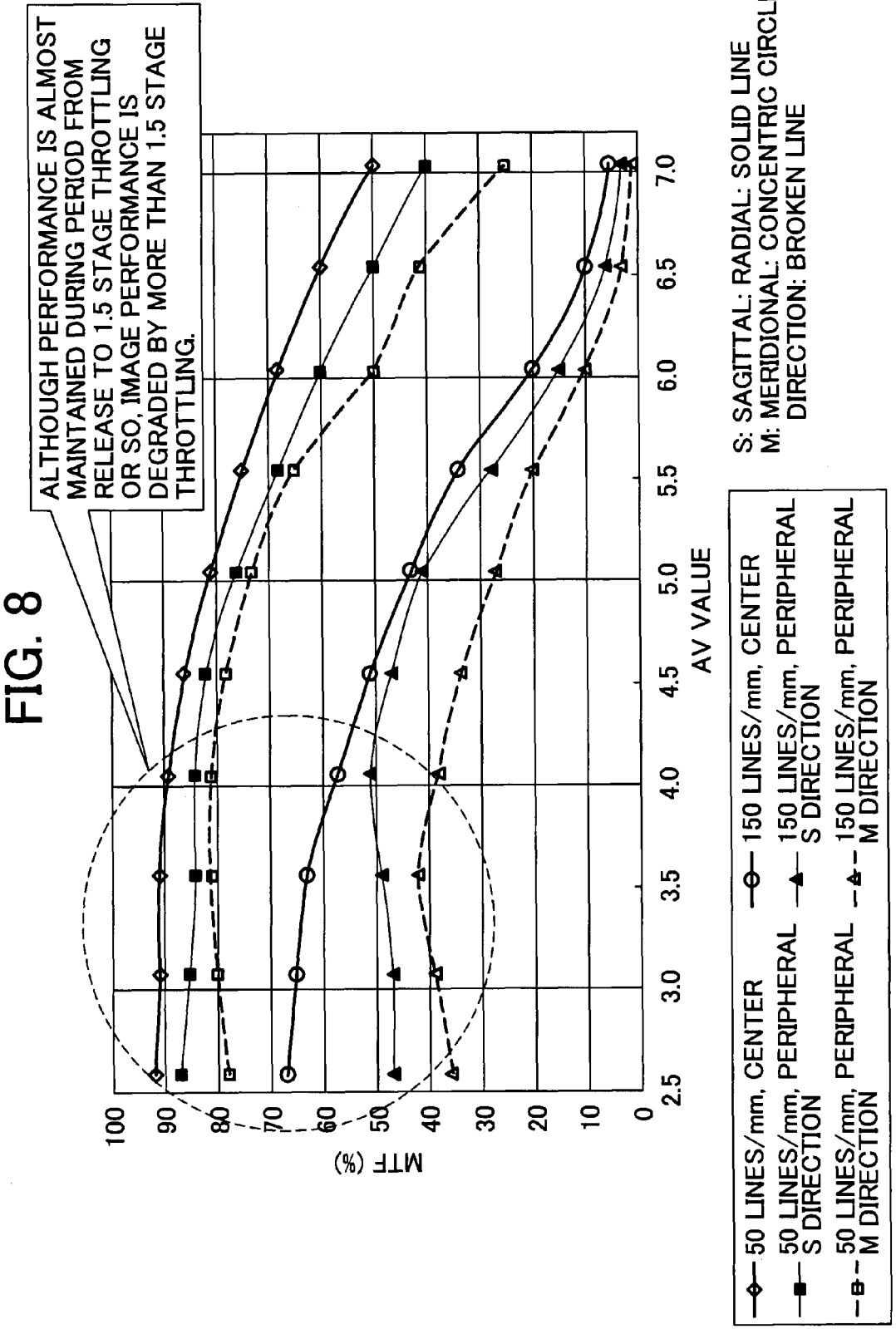

IMAGE CAPTURING APPARATUS

The present patent application claims priority under 35 U.S.C.§119 upon Japanese patent Application No. 2005-303077, filed in the Japan Patent Office on Oct. 18, 2005, the disclosure of which is incorporated by reference herein in its entirety.

BACKGROUND OF THE INVENTION (1) Field of the Invention

The present invention relates to an image capturing apparatus for such as a digital camera. More particularly, the invention is directed to adjustment of an amount of light for producing high-quality images.

(2) Related Art Statement

With respect to an image capturing apparatus using an image-forming optical system such as lenses, particularly a digital camera, the quality of images is deteriorated due to influence of diffraction at an edge of a diaphragm, when an aperture stop is reduced in photographing a subject at a high brightness. For this reason, light extinction means using an ND (neutral density) filter is often employed in a high-grade camera so that the diaphragm need not be throttled beyond a predetermined level. On the other hand, tech-savvy camera users desire cameras which can realize photographing effects with the diaphragm. That is, such cameras are desired, which can reduce the diaphragm aperture to a smaller degree so as to ensure a depth of the subject field, whereas its diaphragm aperture can be largely opened to appropriately defocus a background or a foreground. For realizing the above object, plural-stage diaphragms are often used in high-grade cameras.

In order to satisfy the above two demands, it is effective to mount a multistage diaphragm using the ND filter in the camera. FIG. 4 shows an outer appearance of a shutter unit 14 with a multistage diaphragm using an ND filter 35 in combination. In FIG. 4, the multistage diaphragm 13 is generally constituted by a plurality of diaphragm blades, which are driven by driving cams with a pulse motor, thereby realizing a desired aperture diameter. Since the pulse motor is used as the driving source for the multistage diaphragm 13, the aperture diameter is varied stepwise. The multistage diaphragm is usually designed such that the diaphragm aperture diameter varies every ½ AV or ⅓ AV per one pulse. According to the ND filter 35, a sheet-like filter is ordinarily bonded to a blade member as a support, and the amount of light is adjusted by moving the vane members onto or away from the optical axis.

The light amount may be adjusted by using the ND filter having such a size as to cope with the released state of the diaphragm. However, since the ND filter is costly, the ND filter preferably has as small a size as possible. That is, if an exposure diagram as shown in FIGS. 10 and 11 can be attained, it is preferable that the ND filter is used in the state that the aperture stop is reduced to some extent, and the smaller ND filter copes with the situation. As the ND filter has a small size, a mechanism for retaining and driving the ND filter can be made smaller. The dimensional relationship between the released diaphragm aperture diameter and the ND filter 35 is set in the example of FIG. 4 such that the ND filter 35 can be used in the state that the diaphragm 13 is throttled from the released aperture value by 1 AV or more.

As to the multistage diaphragm combined with the ND filter to be used in the case of the high-grade camera as mentioned above, the camera can be so constructed that the ND filter can be used from the released state or the near-released state of the diaphragm. Thus, in some area, there are two patterns with respect to a given light extinction amount required between the released diaphragm aperture value and the minimum aperture value: one pattern being a case in which throttling is effected with the multistage diaphragm alone and the other being a case in which the amount of the light is reduced by using the diaphragm and the ND filter in combination. FIG. 5 shows an example thereof In FIG. 5, shaded regions indicate that F-values and AV values in use of the multistage diaphragm alone overlaps with those in using the multistage diaphragm and the ND filter in combination, respectively. FIG. 6 is an exposure diagram showing the above. In FIGS. 5 and 6, the AV values with no ND filter overlaps with that with ND filter over the six stages from F5.0 to F9, respectively. The released state of the multistage diaphragm is indicated by an encircled figure "1", whereas the minimum aperture stage is indicated by an encircled figure "12". Encircled figures indicate specific aperture stages, respectively. In FIG. 6, lines corresponding to uses of the ND filter in multi-stage No. 9 to 12 of the diaphragm are also drawn. In the actual camera, the light amount-reduced states over these four cases are not used, because use of around the LV1 to LV8 is sufficient.

When the same light amount-reduced state is attainable with respect to a specific luminance of a specific subject by any one of the use of the multistage diaphragm alone and the use of the multistage diaphragm and the ND filter in combination, it is a problem as to which is appropriate, the use of the multistage diaphragm alone or the use of the multistage diaphragm and the ND filter in combination. FIG. 7 compares advantages and disadvantages between the multistage diaphragm based light amount reduction system and the ND filter based light amount reduction system. What is first to be considered in case of the cameras lies in how to obtain better quality images. In that case, the problem to be considered is degradation in the quality of the images at the time of small aperture as mentioned above. This is the greatest reason why the ND filter is used as the light reduction or extinction means. The ND filter is used to remove adverse effects due to the small aperture stop. FIG. 8 shows an example of the relationship between the aperture stop and the image quality (IF). As shown in FIG. 8 when the aperture stop is throttled by around one stage, the MTF is maintained to some good degree, but the MTF dearly decreases when the aperture is more throttled. It is preferable to use the light extinction system with the ND filter so as to prevent such degradation of the MTF.

On the other hand, the reason why the multistage diaphragm is preferably used is that the depth of subject field can be set according to a photographer's intention. In order to attain an appropriate focus over a wide range from a close view to a distant view, a control method (multistage diaphragm) in which the aperture is reduced at multi-stages is required.

Next, with respect to a problem such as a ghost image or reduction in the peripheral light amount, there will be a difference between the multistage diaphragm light extinction-based system and the ND filter light extinction-based system. The ND filter system is more disadvantageous for the ghost image, because a reflecting surface increases. Such a ghost image is reduced by throttling with the multistage diaphragm when the ghost is shielded by the aperture stop. With respect to the problem in which the peripheral light amount decreases, the light amount is made nearly uniform to mitigate the problem, when the aperture stop is made smaller, whereas the problem is not reduced by the ND filter (See FIG. 9).

With respect to the power consumption, there is a difference between the multistage diaphragm light extinction system and the ND filter light extinction system. The multistage diaphragm is driven by a pulse motor in many cases, and the pulse motor having two coils is disadvantageous in terms of the power consumption, that is, the power consumption is larger. On the other hand, the ND filter has only two positions: an advanced position onto the optical axis and a position retracted from the optical axis, so that a moving magnet or the like having one coil can be used. Thus, the ND filter is advantageous in terms of the power consumption, that is, the power consumption is smaller. However, in order to reduce the power consumption, it is the best way to keep the unmoved state as much as possible.

In light of the above-mentioned prior art techniques, there has been proposed an image pickup apparatus in which an optimum camera controlling method is selectively switch controlled under consideration of the advantages and the disadvantages of the multistage diaphragm light extinction system and the ND filter light extinction system for example, JP 2003-134393A). More specifically, the apparatus comprises an exposure controller which is to perform the control by using an aperture stop and a transmittance controlling means in combination, wherein the exposure controller has a first operation mode in which the aperture stop and the transmittance controlling means are controlled to have precedence on the depth of subject field. In addition to the first operation mode, this exposure controller has a second operation mode in which the aperture stop and the transmittance controller are controlled to have precedence on the resolution. Thereby, the apparatus makes the control by switching between the first operation mode and the second operation mode, depending upon the photographing condition.

SUMMARY OF THE INVENTION

The present invention is to improve the prior art as described in JP 2003-134393 A2, and to provide an image capturing apparatus which improves the prior art technique as described in JP 2003-1343943 with the multistage diaphragm and the high-quality image attaining ND filter as the light amount adjusting means in combination. The image capturing apparatus according to the present invention comprises a first light extinction unit present on an optical axis of the optical unit and configured to adjust an amount of light by changing a dimension of a aperture stop thereof a second light extinction unit to be present on said optical axis of the optical unit and configured to adjust an amount of light passing therethrough by changing a transmittance of the light, wherein chances of using the second light extinction unit are reduced as much as possible, thereby reducing costs, making a lens barrel smaller through reduction in size of a driving unit for the second light extinction unit and realizing stabilized operation of the lens barrel.

The present invention relates to an image capturing apparatus comprising an optical unit for forming an image of a subject, a first light extinction unit present on an optical axis of the optical unit and configured to adjust an amount of light by changing a dimension of a aperture stop thereof, a second light extinction unit to be present on said optical axis of the optical unit and configured to adjust an amount of light passing therethrough by changing a transmittance of the light, and a controller for controlling operations of said first and second light extinction units so as to make an exposure optimum at a time of photographing, wherein the controller has precedence on the adjustment of the light amount with the first light extinction unit until a predetermined aperture stop and has precedence on the adjustment of the light amount with the second light extinction unit in a state that the light is to be reduced beyond a state in the predetermined aperture stop, thereby attaining optimization of the exposure.

In order to satisfy needs for high-quality images, the invention copes with the adjustment of the light amount not by the second light extinction unit alone but by the second light extinction unit in the state that the aperture stop of the first light extinction unit is throttled at or beyond the predetermined aperture stop slightly throttled. By so doing, the problems of the resolution, the reduction in the peripheral light amount and the ghost image can be resolved with an optimum balancing, thereby obtaining higher quality of images as compared with the prior art technique.

BRIEF DESCRIPTION OF THE DRAWINGS

For a better understanding of the invention, reference is made to the attached drawings, wherein:

FIG. 5 is a view showing an example in table of a case of using a multistage diaphragm and an ND filter in combination for a conventional camera.

FIG. 7 is a table making comparison in the light extinction system between the aperture stop and the ND filter.

FIG. 8 is a graph showing the relationship between the aperture stop and the MTF.

PREFERRED EMBODIMENTS

Embodiments of the image capturing apparatus according to the present invention will be explained with reference to the attached drawings.

Figure 4:
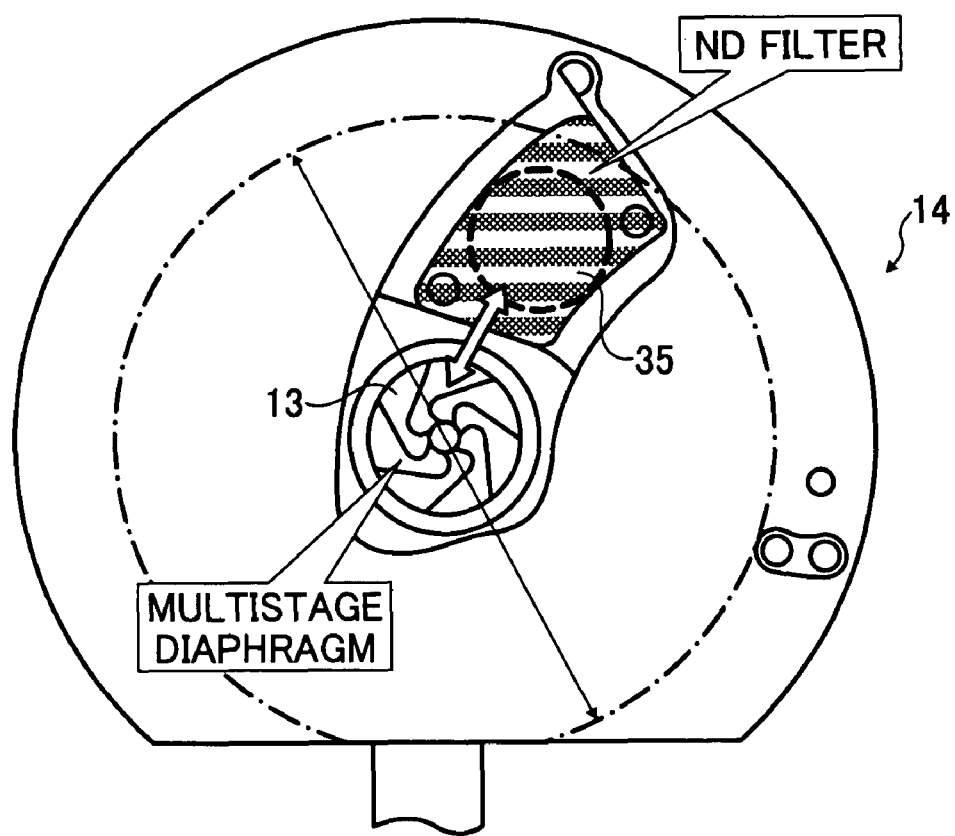
FIG. 4 is a front view of an embodiment of a light extinction unit to be used in the image capturing apparatus according to the present invention.
Figure 6A:
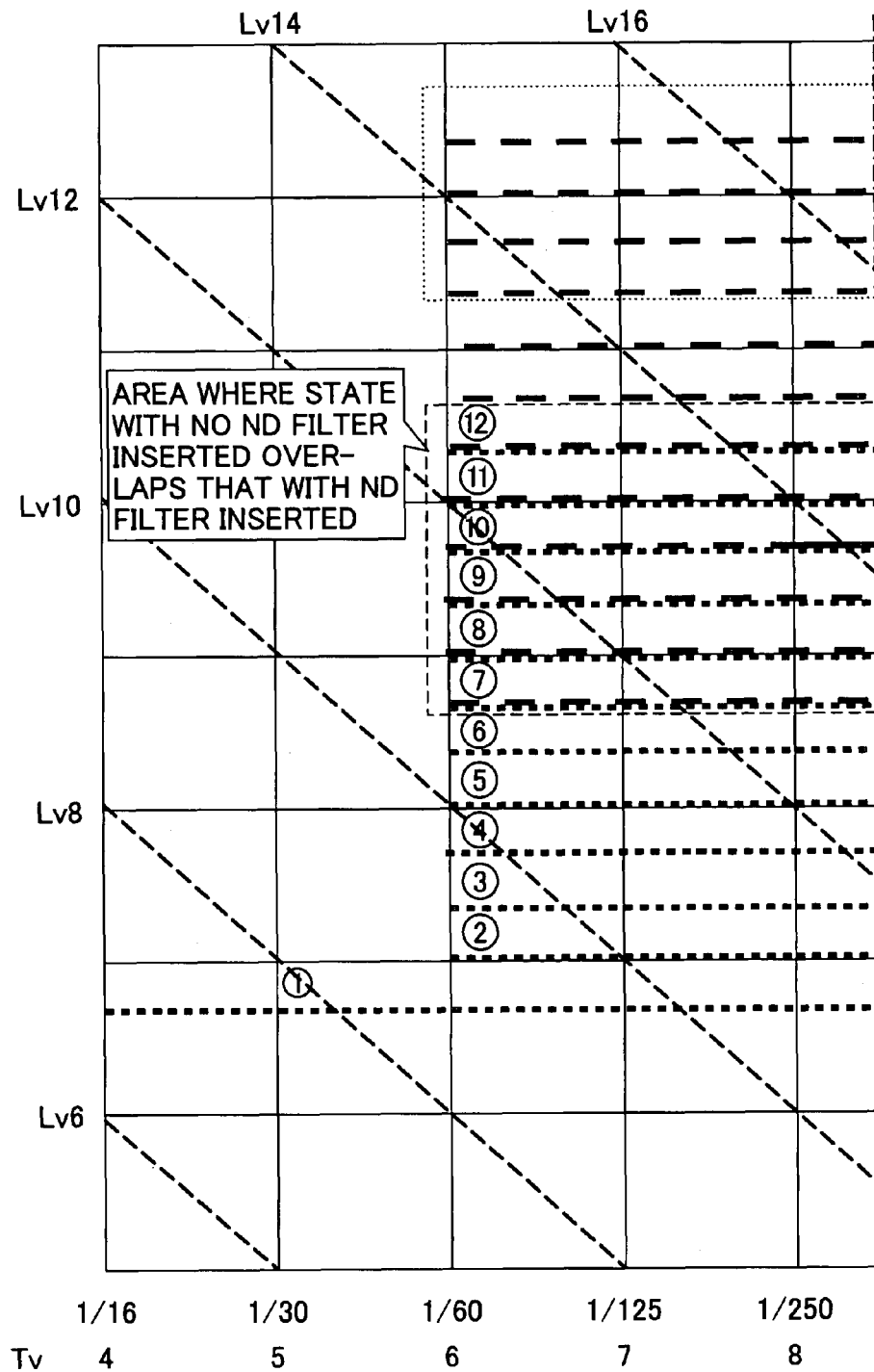
FIG. 6 is a diagram of the case of using the multistage diaphragm and the ND filter in combination in the conventional camera.
Figure 6B:
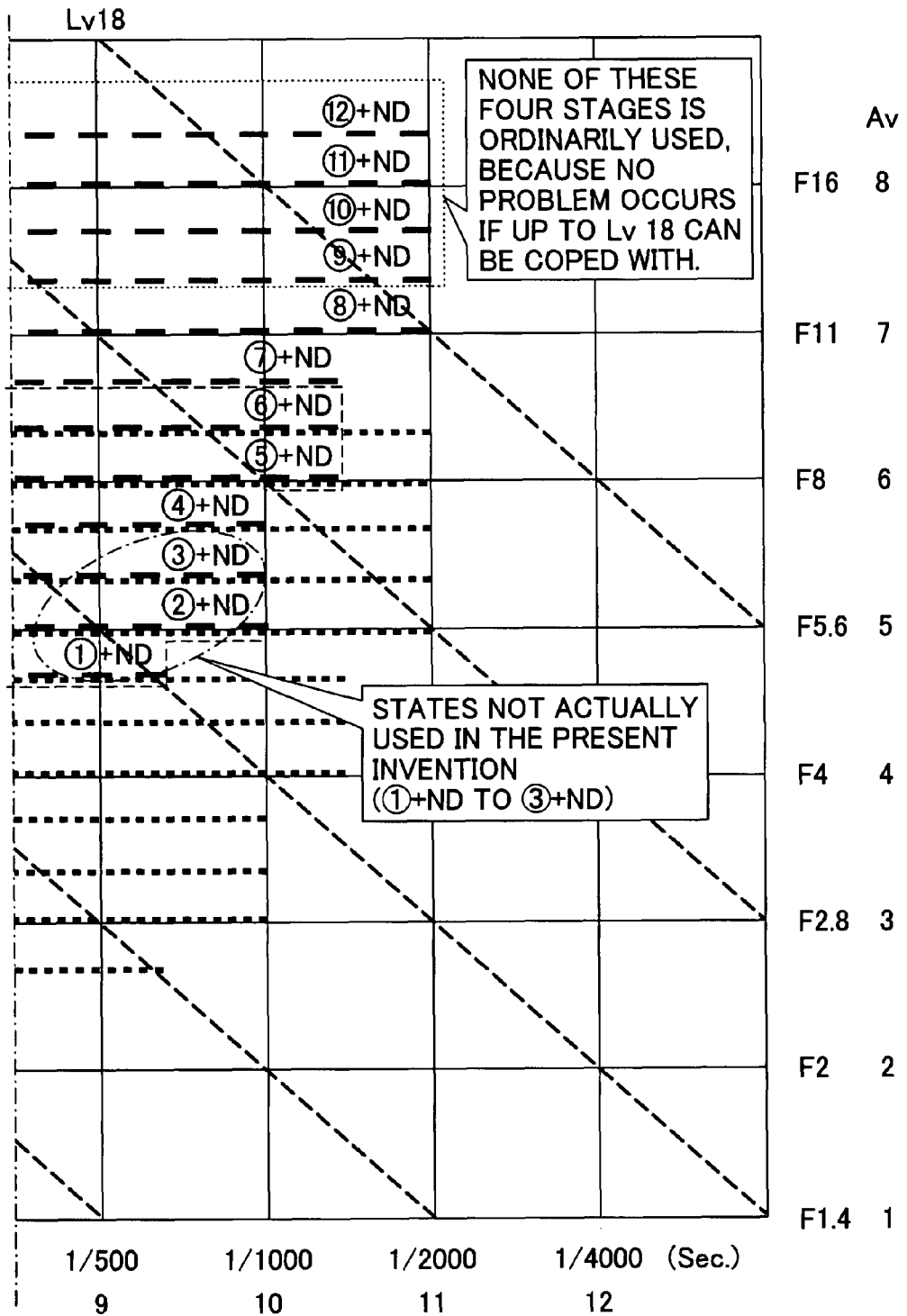

The present invention can be applied to a camera provided with a shutter unit having a construction, being identical with as that 14 shown in FIG. 4, composed of a multistage diaphragm 13 and an ND filter 35 in combination. The multistage diaphragm has any arbitrary concrete construction, so long as the diameter of its aperture stop may be adjusted at plural stages. The ND filter also has any arbitrary construction of an operating mechanism, so long as the ND filter can be advanced onto and retracted from the optical axis of an optical unit, such as a photographing lens, for forming an image of a subject.

Figure 3:
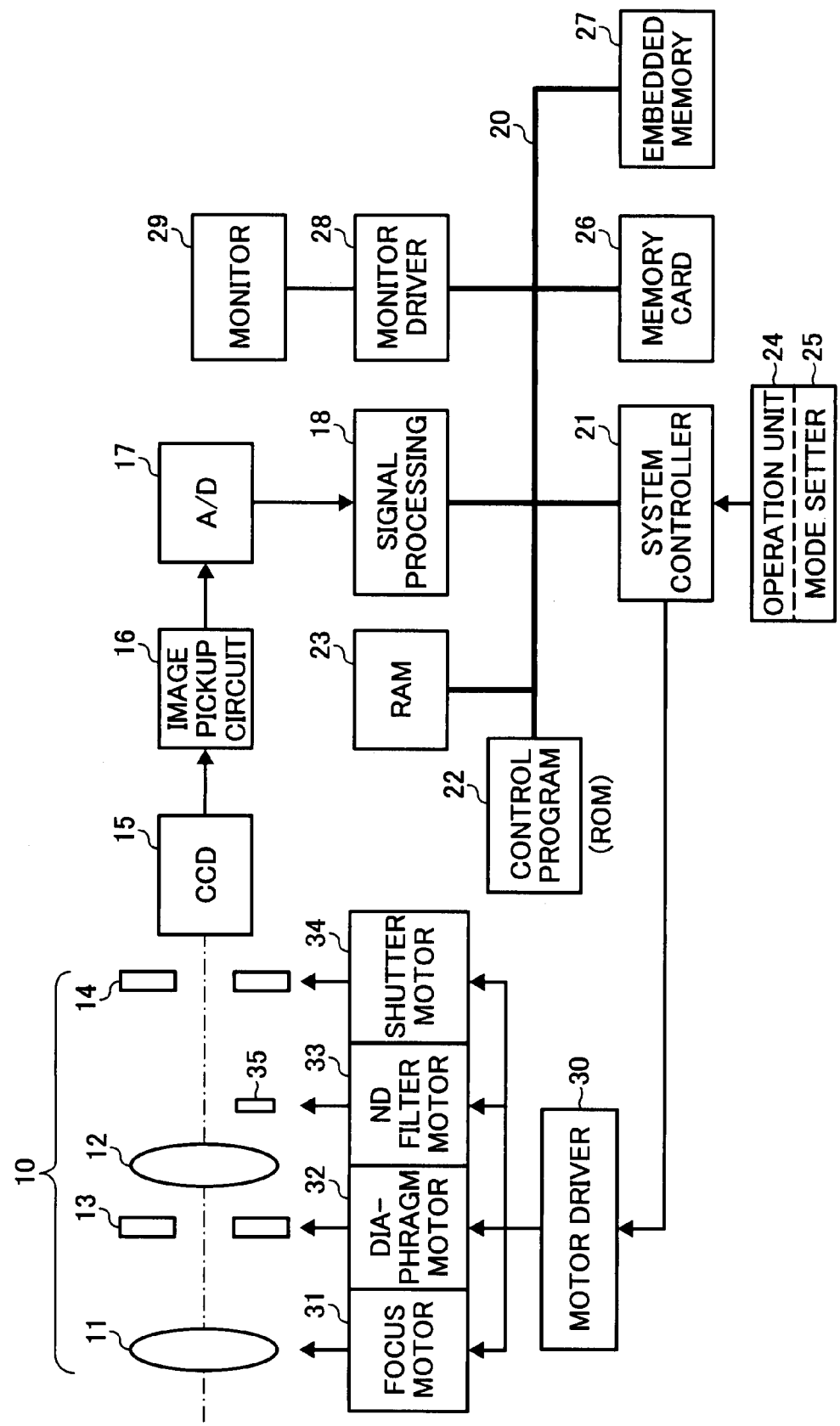
FIG. 3 is a block diagram showing an embodiment of a control system to be used in the image capturing apparatus according to the present invention.

FIG. 3 shows an example of a controlling system for a digital camera as an embodiment of the image capturing apparatus according to the present invention. In FIG. 3, a reference numeral 10 indicates an optical unit including photographing lenses for forming an image of a subject. The optical unit 10 is assembled in a lens barrel. In the lens barrel, a focusing lens unit 11 and another lens unit 12 are assembled. Depending upon the specification, a zooming mechanism by which plural lens units 11, 12 are independently moved may be incorporated. The ND filter 35 is assembled behind the lens unit 12, and a shutter unit 14 is assembled behind the ND filter. This ND filter is configured to be advanced onto and retracted from the optical axis of the photographing lens unit by means of an appropriate driving mechanism.

The above lens unit 11 is driven along the optical direction by a focusing motor 31. The aperture diameter of the multistage diaphragm 13 is adjusted at plural stages by means of a diaphragm motor 32. The ND filter 35 is advanced onto the optical axis of the photographing lens unit by means of an ND filter motor 33. The shutter unit 14 is driven by a shutter motor 34. Each of the motors 31 to 34 is controlled by a motor driver 30 which is to be controlled by a system controller 21. A CCD 15 as an image pickup element is arranged at a place where an image is formed through the optical unit 10. An image is converted to an electric signal for each of pixels of the CCD 15 according to brightness of the image of the subject on each pixel. The electric signals converted in the pixels of the CCD 15 are taken out through an image pickup circuit 16 in a specific order, which are converted to digital signals by an A/D converter 17 and inputted into a signal processing circuit 18. The signal processing circuit 18, the system controller 21, a read-only memory (ROM) 22 storing a control program, a random access memory (RAM) 23 for storing data, a memory card 26, an embedded memory 27 and a monitor driver 28 are connected with bus lines 20. The system controller 21 comprises a CPU (central control processing unit) or a microcomputer, for example, and controls an object to be controlled, based on operation signals from an operation unit 24 and other inputted data according to the control program stored in the memory 22. The operation unit 24 has a mode-setting section 25. The monitor driver 28 displays the image of the subject in real time, or displays photograph data under control of the system controller 21.

As mentioned above, the image capturing apparatus according to the present invention comprises the optical unit for forming the image of the subject, the first light extinction unit present the optical axis of the optical unit and configured to adjust the amount of light by changing the dimension of the aperture stop thereof, the second light extinction unit to be present on said optical axis of the optical unit and configured to adjust the amount of light passing therethrough by changing the transmittance of the light, and the controller for controlling operations of said first and second light extinction units so as to make the exposure optimum at a time of photographing, wherein the controller has precedence on the adjustment of the light amount with the first light extinction unit until a predetermined aperture stop and has precedence on the adjustment of the light amount with the second light extinction unit in a state that the light is to be reduced beyond a state in the predetermined aperture stop, thereby attaining optimization of the exposure. The wording "has precedence on the adjustment of the light amount with the first light extinction unit", means that the adjustment of the light amount with the first light extinction unit is performed in preference to the adjustment of the light amount with the second light extinction unit. On the other hand, the wording "has precedence on the adjustment of the light amount with the second light extinction unit" means that the adjustment of the light amount with the second light extinction means is performed in preference to the adjustment of the light amount depending upon the speed of the shutter. The multistage diaphragm 13 shown in FIGS. 3 and 4 corresponds to the first light extinction unit. The ND filter 35 shown in FIGS. 3 and 4 corresponds to the second light extinction unit. The system controller 21 and the control program stored in the memory 22 shown in FIG. 3 correspond to the controller. The present invention comprises the mode setter 25 as a mode setting unit, so that the light amount can be adjusted according to a motion mode set at the mode setter 25. In the following, controlled operation examples of the first and the second light extinction units are specifically explained for each of the operation modes.

Figure 11A:
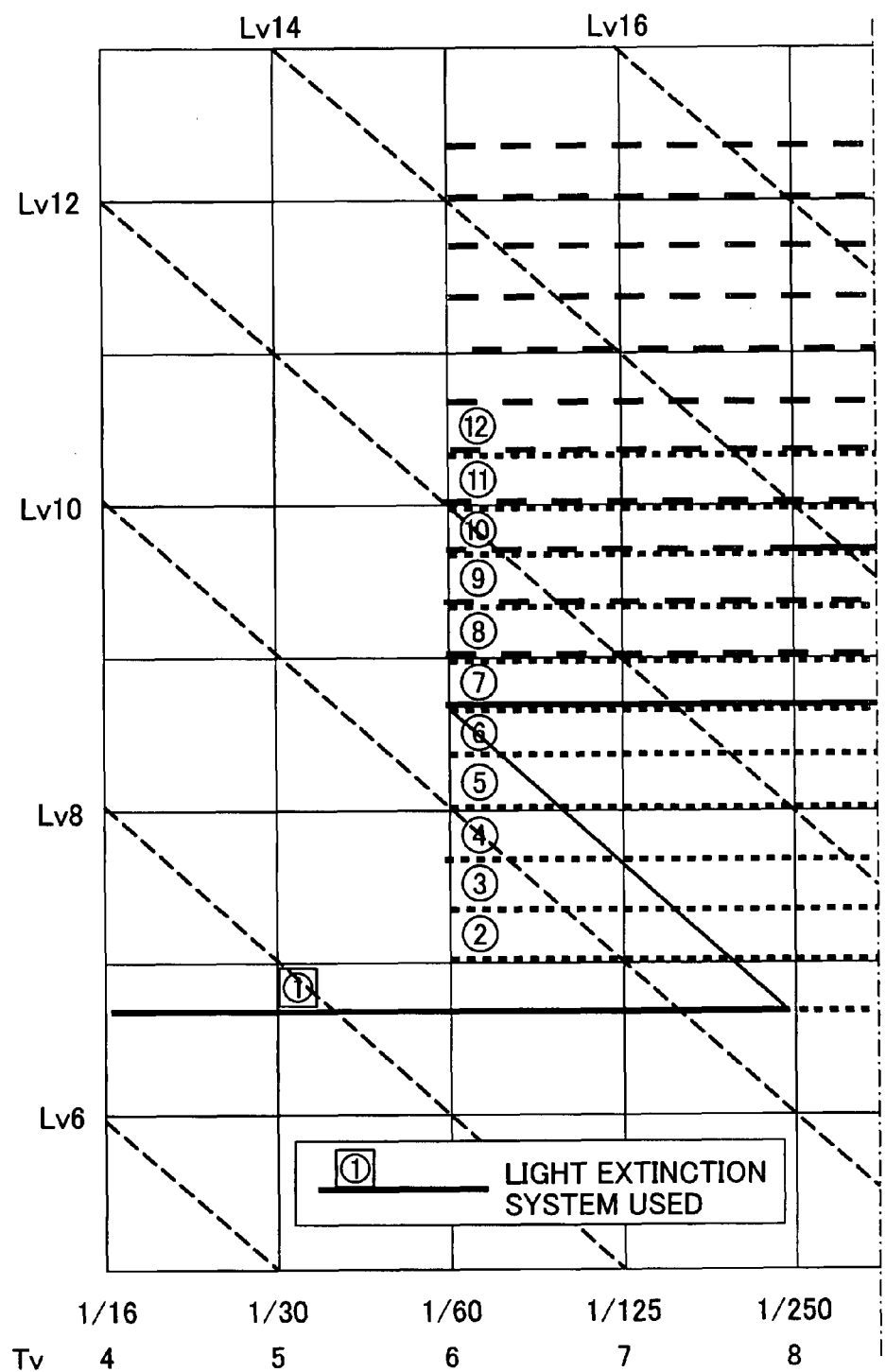
FIG. 11 is a diagram of exposure showing an example of a combination of the multistage aperture stop and the ND filter at a time of a mode taking precedence on the resolution in the conventional camera.
Figure 11B:
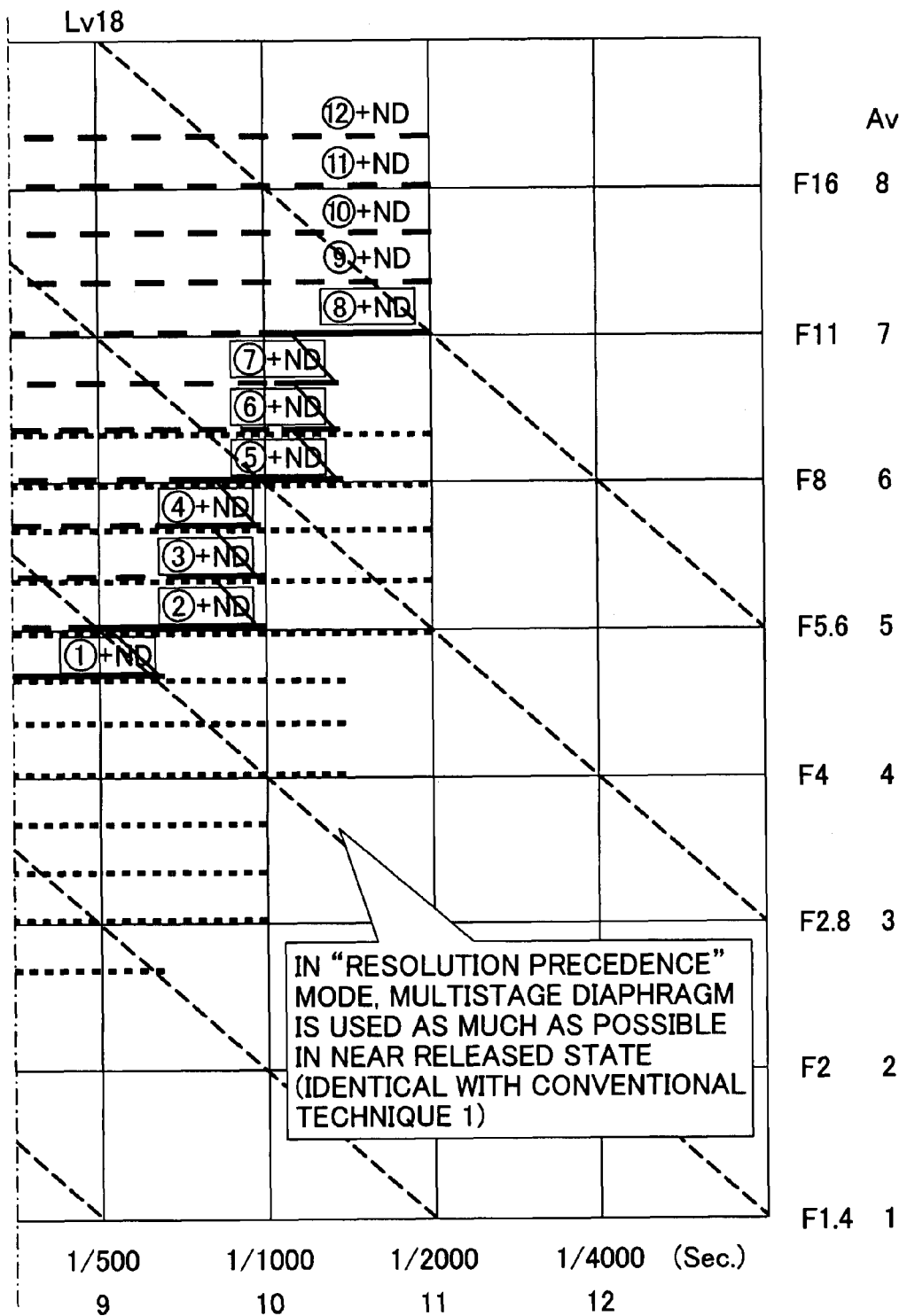

An exposure diagram will be explained when the mode is set at "diaphragm-precedent mode" shown in KG. 10. This exposure diagram is drawn, which a user selected by putting precedence upon the aperture value under consideration of "depth of subject field to be photographed" in FIG. 7. The amount of light is adjusted by using the multistage diaphragm alone. Therefore, this is identical with the conventional adjustment, and not novel. FIG. 11 shows an exposure diagram under consideration of the resolution (MTF). This exposure diagram is an exposure diagram drawn by making much of the adjustment of the light amount with the ND filter under precedence upon the "image performance CMTF)" shown in FIG. 7. If the camera has a high-resolution mode, it is preferable that the adjustment of the light amount with the ND filter is more frequently used and the aperture stop as dose as possible to the released state is used. The exposure diagram shown in FIG. 11 is near to the idea of the conventional case, which differs from the ideal of the present invention.

Figure 9:
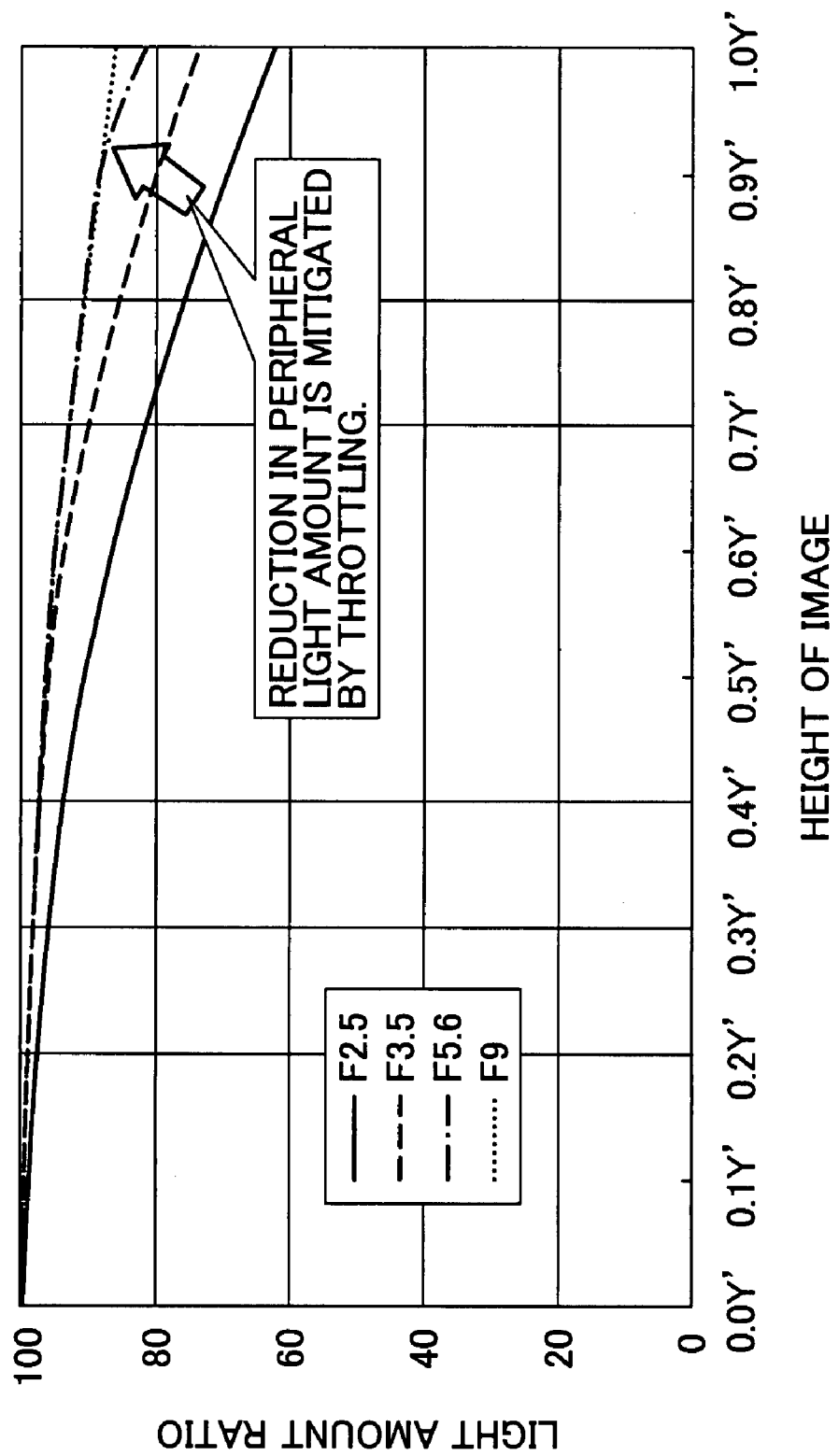
FIG. 9 is a graph showing the relationship between the aperture stop and the peripheral light amount.
Figure 10A:
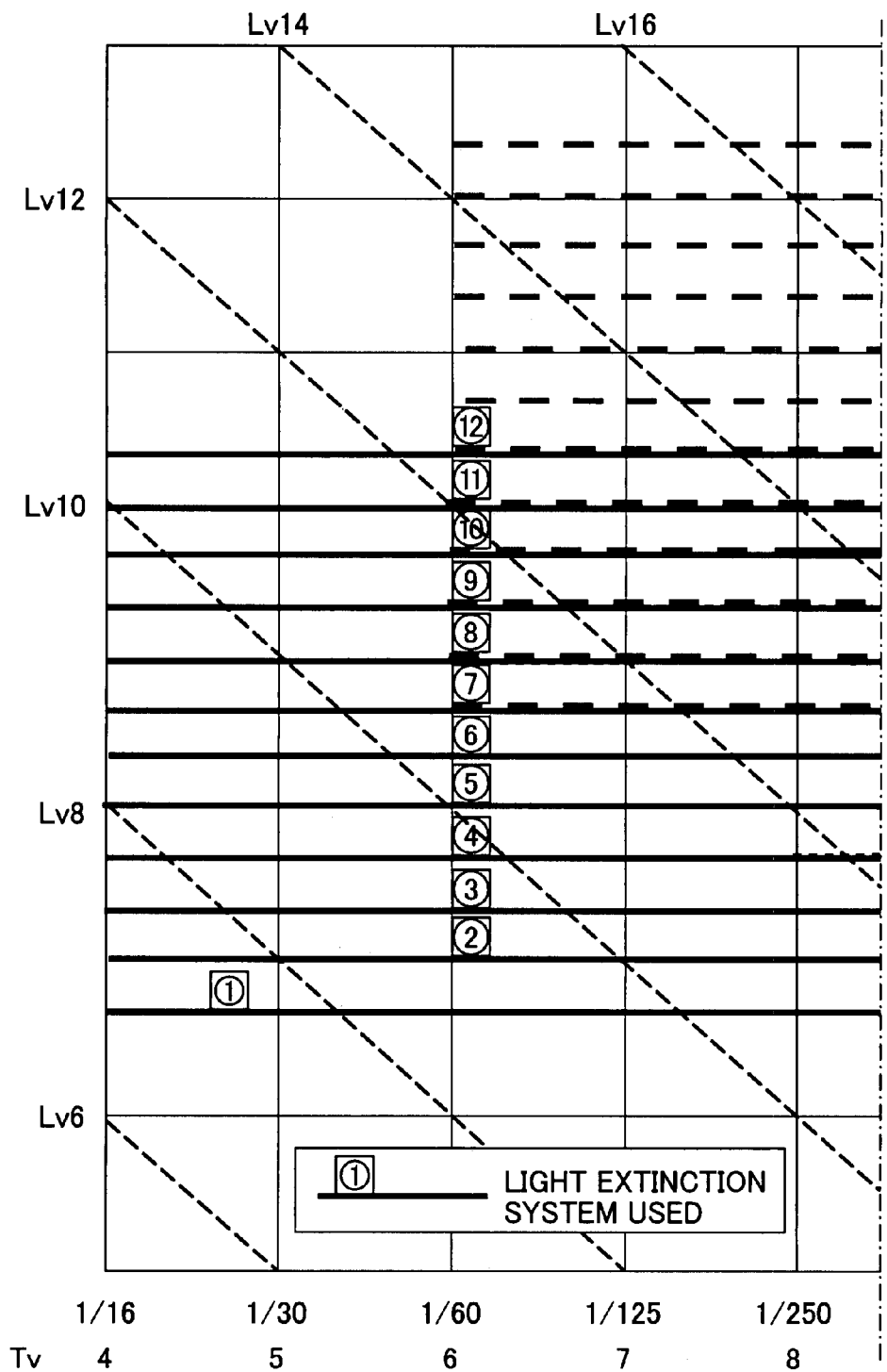
FIG. 10 is a diagram of exposure showing an example of a combination of the multistage aperture stop and the ND filter at a time of a mode taking precedence on the diaphragm in the conventional camera.
Figure 10B:
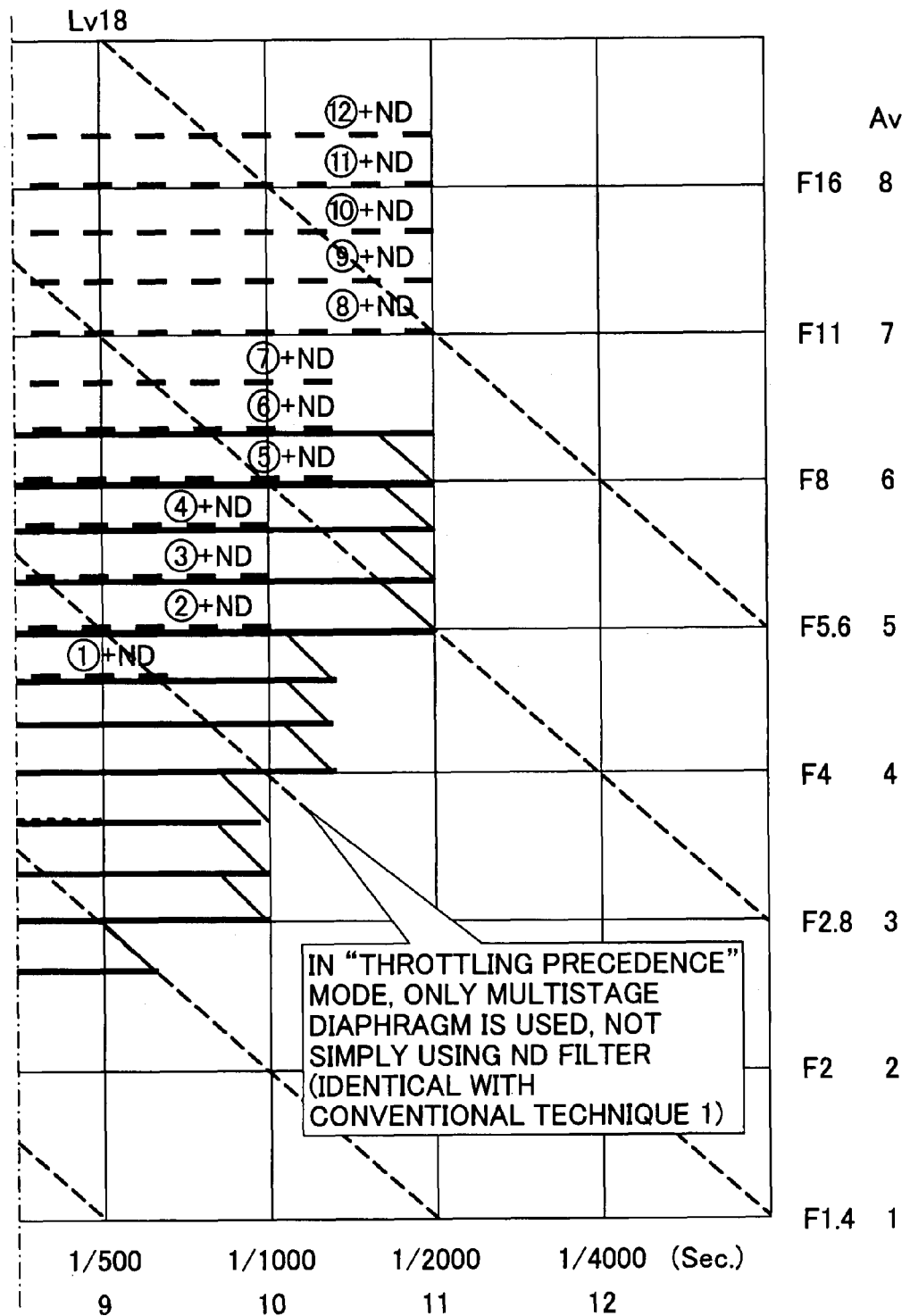

Next, one embodiment of the image capturing apparatus according to the present invention will be explained based on the example shown in the exposure diagram given in FIG. 1. In this embodiment, the optimum high-quality image can be obtained under consideration of "ghost image" and "peripheral light amount" in addition to the "image performance (MTF)" shown in FIG. 7. As explained in connection with FIG. 8, when the aperture diameter of the multistage diaphragm is throttled, the resolution (MTF) decreases, but does not largely change until a level of −1 AV. To the contrary, there is a case where the ghost decreases when the multistage diaphragm is throttled even slightly from the released aperture stop. Further, decrease in the peripheral light amount is clearly mitigated by throttling even at the level of −1 AV as shown in FIG. 9.

Figure 1A:
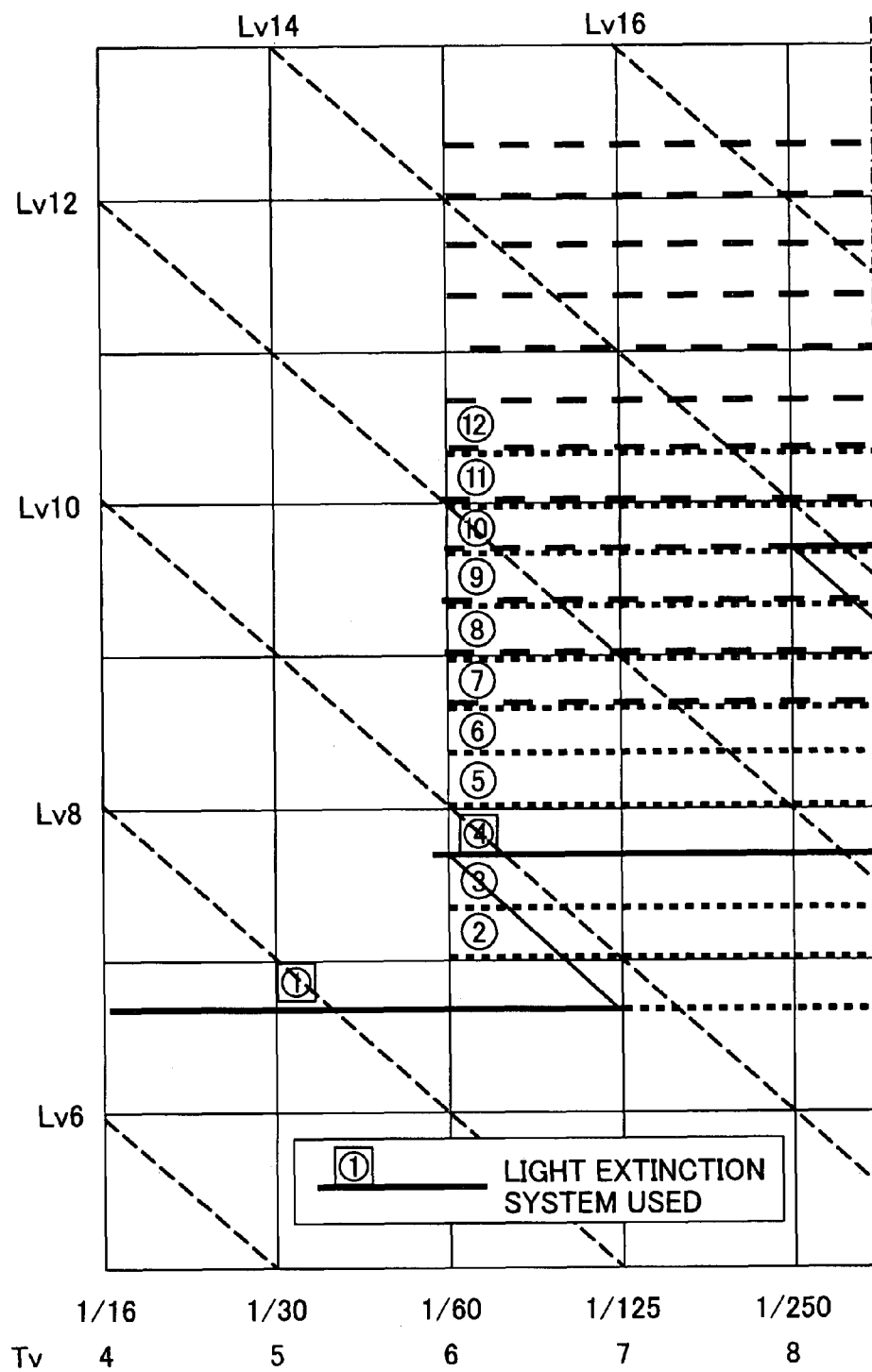
FIG. 1 is a diagram of exposure in one embodiment of an image capturing apparatus according to the present invention.
Figure 1B:
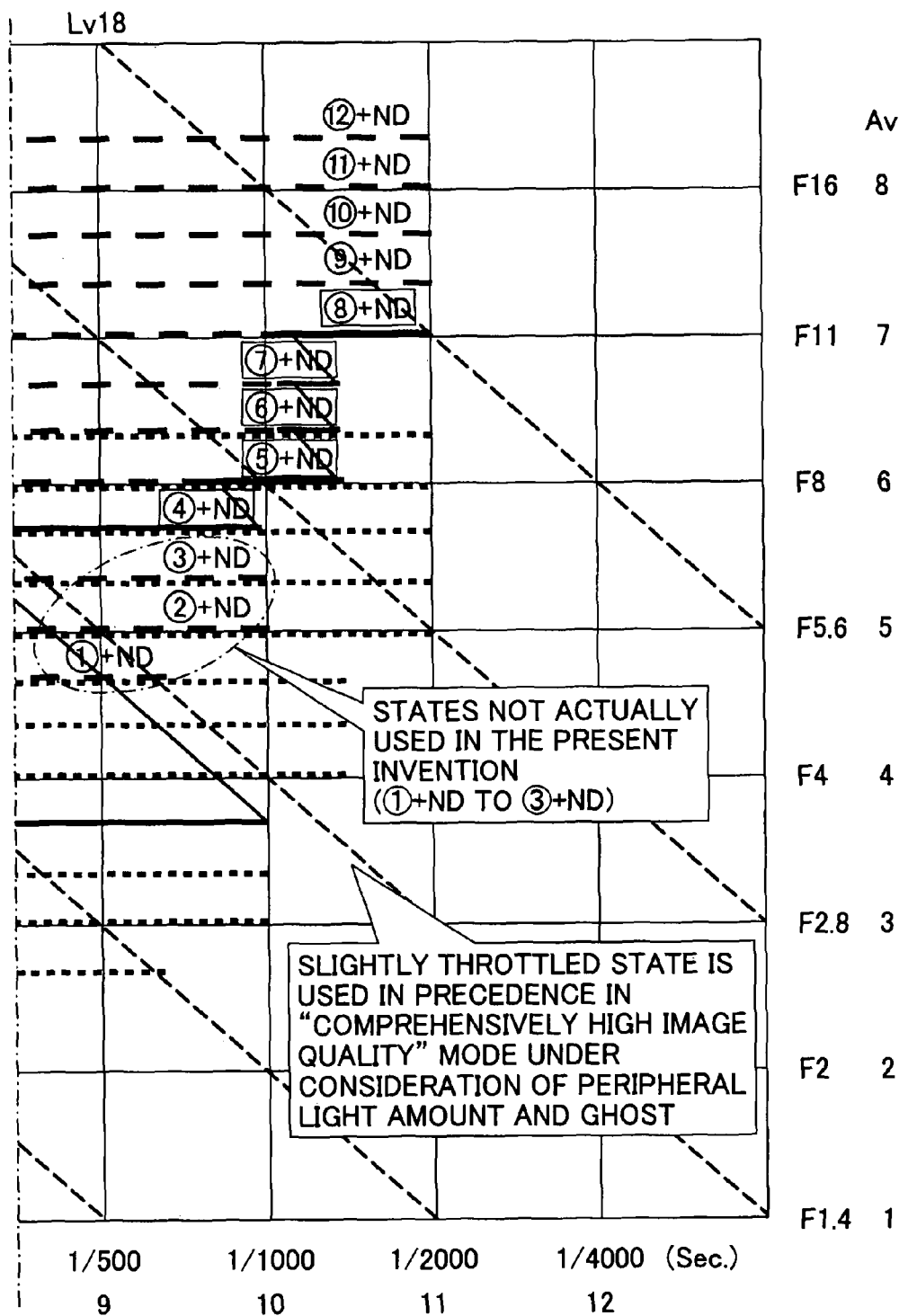

In view of the above, FIG. 1 is an exposure diagram showing one embodiment of the present invention, which exposure diagram is set to obtain comprehensively good image quality. In FIG. 1, the abscissa axis denotes the shutter speed and the Tv value corresponding thereto, and the ordinate axis denotes the aperture value of the first light extinction unit and the Av value corresponding thereto. Encircled figures denote the stages for adjustment of the light amount, and the light amount can be adjusted every ⅓ Lv. The encircled 1 denotes that the multistage diaphragm is released, and the exposure light amount is controlled by switching the shutter speed according to the brightness of the subject. The encircled figure of 4 is a state of the multistage diaphragm throttled by one stage. In this state, the exposure light amount is controlled by switching the shutter speed from 1/60 second to 1/1000 second stepwise.

Next control of the light amount is one of the features of the present invention in which the exposure is made optimum at the time of photographing by taking the precedence upon the state that the ND filter is added as the second light extinction unit to the state in which the multistage diaphragm is throttled by one stage, i.e., at the encircled 4. As the ND filter is used in combination in the state that the multistage diaphragm is throttled by one stage, a range in which the optimum exposure can be obtained by switching the speed of the shutter can be set relatively wide. The multistage diaphragm need not be so largely throttled by using the ND filter in combination, even if the brightness of the subject is large. By so constructing, occurrence of the ghost and reduction in the peripheral light amount can be decreased under the photographing condition that the ghost and the reduction in the peripheral light amount would be conspicuous. The above photographing mode can be set as the "comprehensively high-quality image" at the mode setting section 25 shown in FIG. 3. Besides the "comprehensively high-quality images" mode, it is also useful to set the "outdoor mode" or the like can be usefully set in which the sun light is present and the peripheral light amount of the sky portion is conspicuous.

According to the above embodiment, the exposure is optimized such that the light amount is adjusted by putting the precedence upon the multistage diaphragm (first light extinction unit) until a predetermined diaphragm aperture diameter, and than the light amount is adjusted by putting precedence upon the ND filter (second light extinction unit) in the state that the light amount should be reduced beyond the state with the predetermined diaphragm aperture diameter. Consequently, the higher quality of images can be obtained even in the ordinary photographing mode as compared with the conventional technique.

The wording "the predetermined diaphragm aperture (stop) diameter" includes a case where the multistage diaphragm is the released aperture (stop). That is, it may be that the ND filter is used in the released diaphragm or that the ND filter is used in the case other than the released diaphragm. In present embodiment, the miniaturization of the ND filter is intended to realize high quality images rather than to attain miniaturization of the image capturing apparatus.

According to the above embodiment, the invention technique is not limited to a case where the camera is set to a special photographing mode, but the invention may be applied to the ordinary operation mode. Even in this operation mode, higher quality of the images can be obtained as compared with the conventional technique.

If it is designed that the ND filter is used from the aperture throttled stage on the way of the multistage diaphragm, the ND filter itself can be made smaller with the cost reduced. Further, the miniaturization of the lens barrel can be realized to reduce the size of the camera.

Figure 2A:
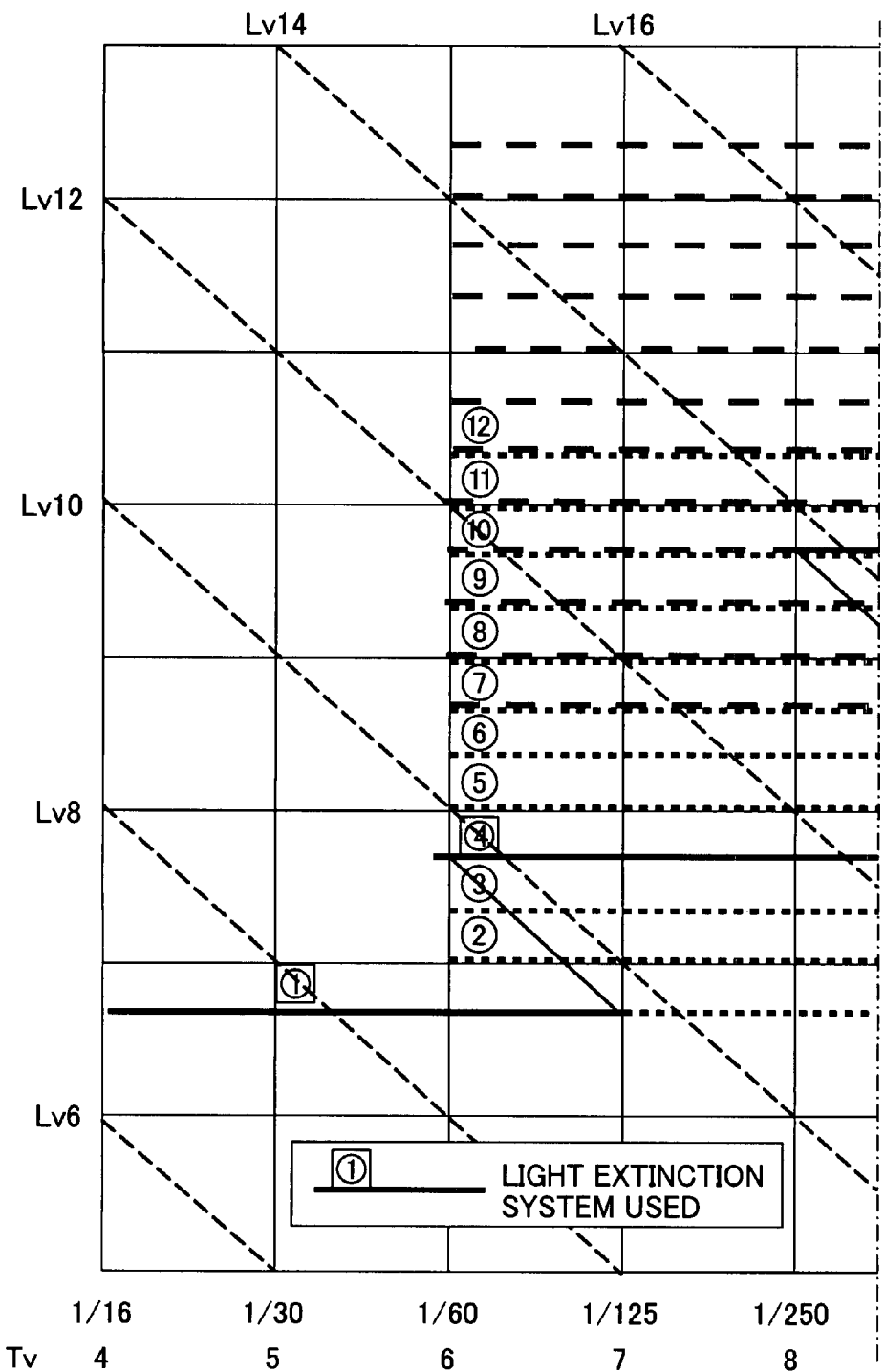
FIG. 2 is a diagram of exposure in another embodiment of an image capturing apparatus according to the present invention.
Figure 2B:
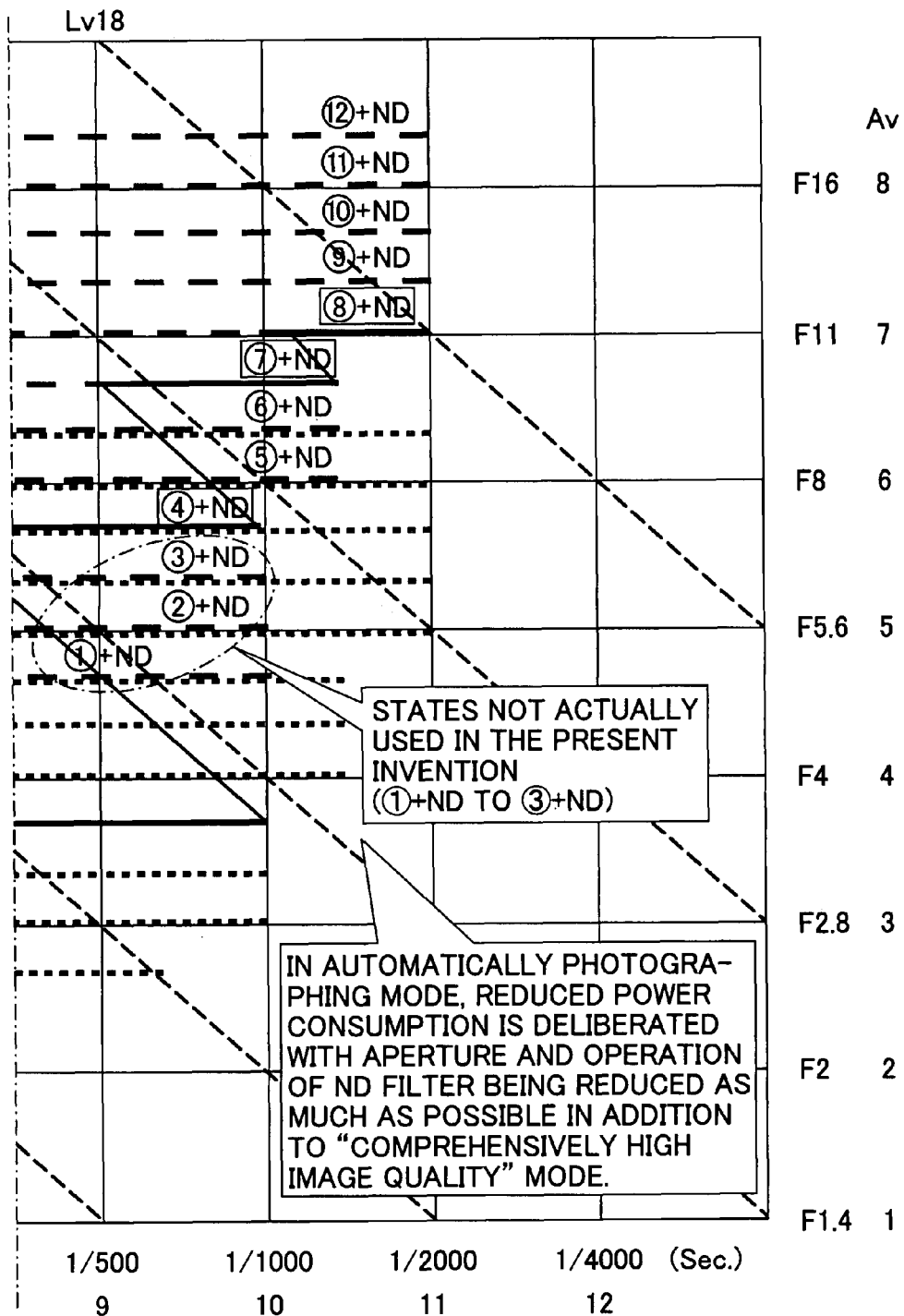

Although the embodiment most useful for obtaining the high-quality image is the above one according to the exposure diagram shown in FIG. 1. In addition, the power consumption recited last in the items in FIG. 7 is also the most important factor as an element required for the camera. That is, if the image quality is considered alone, it is considered that the exposure diagram shown in FIG. 1 is most desirable. However, the exposure diagram with smaller power consumption is preferable as a comprehensive automatic control mode or an automatic photographing mode of the camera when the power consumption is considered. The exposure diagram coping with this requirement is one shown in FIG. 2, which is a second embodiment of the present invention. In FIG. 2, an encircled figure "4" is an aperture value throttled from the released aperture by one stage as in FIG. 1. It is designed that while precedence is put on a case where the ND filter is added in the aperture value throttled by one stage, the mechanical driving is made as small as possible in a region requiring the light extinction. In the embodiment of FIG. 1, the encircled figure "5" throttled by two stages+the ND filter, the encircled figure "6" throttled by three stages+the ND filter and the encircled figure "7" throttled by four stages+the ND filter are used. On the other hand, in the embodiment of FIG. 2, the encircled figure "7" throttled by four stages+the ND filter are used alone instead of the above cases. Referring to FIG. 8, the MTF gradually, but not largely, decreases in the order of the aperture value throttled by two stages from the released aperture (=AV4+ND), the aperture value throttled by three stages from the released aperture (=AV4.3+ND) and the aperture value throttled by four stages from the released aperture (=AV4.6+ND). Therefore, in a case where (the aperture value throttled by four stages from the released aperture+the ND filter) is acceptable, the aperture value is throttled by a few stages of the multistage diaphragm and the ND filter is added to this state as shown in FIG. 2. By so doing, the light amount adjusting mode in which the mechanical action of the multistage diaphragm is reduced as much as possible can be set. Thereby, the power consumption can be reduced.

Utility value is not so large in the use of the ND filter when the multistage diaphragm is in the released state. Thus, the ND filter is used starting from the period in which the aperture is throttled to the predetermined diaphragm aperture from the released state. By so constructing, as mentioned above, the ND filter can be made smaller to reduce the cost and make smaller the lens barrel, so that the camera can be made smaller.

Furthermore, the predetermined diaphragm aperture diameter at which the ND filter begins to be used is preferably an aperture diameter immediately before the image begins to be conspicuously degraded due to diffraction of light. By so doing, high quality images can be obtained, and the lens barrel can be made smaller.

In all the above-mentioned embodiments, it is designed that the released aperture value (F value) is F2.5 and the multistage diaphragm aperture is set at 12 stages every ⅓ AV, and the ND filter is set at 2 stages. However, the release aperture value of the multistage diaphragm, the interval of the aperture adjustment, the width of the stages, the number of the stages of the diaphragm, and the light extinction amount of the ND filter are not limited to any specific values and can take any arbitrary figures.

The image capturing apparatus according to the present invention can be applied to various cameras, for examples digital cameras, and handy phone cell-provided camera, etc.

What is claimed is:

1. An image capturing apparatus comprising;
   an image pickup device to convert an image of a subject into an electrical signal;
   a photographing optical system to image the subject image on the image pickup device;
   a diaphragm unit configured to adjust an amount of light passing therethrough by changing a dimension of an aperture stop diameter at plural stages;
   a filter unit configured to change a transmittance of the passing light amount by advancing the filter unit in a direction perpendicular to an optical axis of the photographing optical system and positioning the filter unit at a position on the optical axis or retracting the filter unit from the optical axis position in a direction reverse to the perpendicular direction, and to thereby adjust the passing light amount;
   a shutter unit configured to adjust an amount of exposure of the image pickup device by changing an exposure time thereof; and
   a controller to control operations of the diaphragm unit, the filter unit, and the shutter unit according to a brightness of the subject;

wherein the controller controls the amount of exposure of the image pickup device by controlling the diaphragm unit and the shutter unit without advancing the filter unit at the position on the optical axis, between a stage in which the aperture stop diameter of the diaphragm unit is in a released state and a first stage in which the released aperture stop diameter is throttled from the released state to a level of one aperture value, wherein, in a case that the aperture stop diameter of the diaphragm unit is throttled into a the first stage other than the released stage and the filter unit is not advanced onto the optical axis position, according to a change of the subject brightness, the controller advances the filter unit onto the optical axis position and at the same time throttles the dimension of the aperture stop diameter of the diaphragm unit into the first stage and a second stage departed from the first stage by the one aperture value, wherein, in a case that the aperture stop diameter of the diaphragm unit is throttled into the second stage and the filter unit is advanced onto the optical axis position, the controller changes the exposure time of the shutter unit while maintaining the dimension of the aperture stop diameter of the diaphragm unit at the second stage, according to the change of the subject brightness.

2. The image capturing apparatus as claimed in claim 1, wherein the aperture stop diameter of the diaphragm unit is adjusted at plural stages by a diaphragm motor, the filter unit is advanced onto and retracted from the optical axis by a filter motor, and the shutter unit is driven by a shutter motor.

3. The image capturing apparatus as claimed in claim 2, wherein each of the diaphragm motor, the filter motor, and the shutter motor is controlled by a motor driver which is to be controlled by a system controller.

4. The image capturing apparatus as claimed in claim 1, wherein the shutter unit has a construction composed of a multistage diaphragm and an ND filter in combination.

5. The image capturing apparatus as claimed in claim 4, wherein the shutter unit includes at least one diaphragm blade or a shutter, and wherein the shutter unit is configured to control the amount of exposure on the image pickup device by switching the speed of the shutter according to the subject brightness.

6. An image capturing apparatus comprising:
an image pickup device to convert an image of a subject into an electrical signal;
a photographing optical system to image the subject image on the image pickup device;
a diaphragm unit configured to adjust an amount of light passing therethrough by changing a dimension of an aperture stop diameter at plural stages;
a filter unit configured to change a transmittance of the passing light amount by advancing the filter unit in a direction perpendicular to an optical axis of the photographing optical system and positioning the filter unit at a position on the optical axis or retracting the filter unit from the optical axis position in a direction reverse to the perpendicular direction, and to thereby adjust the passing light amount;
a shutter unit configured to adjust an amount of exposure of the image pickup device by changing an exposure time thereof; and
a controller to control operations of the diaphragm unit, the filter unit, and the shutter unit according to a brightness of the subject;

wherein the controller controls the amount of exposure of the image pickup device by controlling the diaphragm unit and the shutter unit without advancing the filter unit at the position on the optical axis, between a stage in which the aperture stop diameter of the diaphragm unit is in a released state and a first stage in which the released aperture stop diameter is throttled from the released state to a level of one aperture value, wherein, in a case that the aperture stop diameter of the diaphragm unit is throttled into the first stage other than the released state and the filter unit is not advanced onto the optical axis position, according to a change of the subject brightness, the controller advances the filter unit onto the optical axis position and at the same time throttles the dimension of the aperture stop diameter of the diaphragm unit from the first stage into a second stage by a few stages, and, wherein, in a case that the aperture stop diameter of the diaphragm unit is throttled into the second stage and the filter unit is advanced onto the optical axis position, according to the change of the subject brightness, the controller further changes the exposure time of the shutter unit while maintaining the dimension of the aperture stop diameter of the diaphragm unit at the second stage.

7. The image capturing apparatus as claimed in claim 6, wherein the aperture stop diameter of the diaphragm unit is adjusted at plural stages by a diaphragm motor, the filter unit is advanced onto and retracted from the optical axis by a filter motor, and the shutter unit is driven by a shutter motor.

8. The image capturing apparatus as claimed in claim 7, wherein each of the diaphragm motor, the filter motor, and the shutter motor is controlled by a motor driver which is to be controlled by a system controller.

9. The image capturing apparatus as claimed in claim 6, wherein the shutter unit has a construction composed of a multistage diaphragm and an ND filter in combination.

10. The image capturing apparatus as claimed in claim 9, wherein the shutter unit includes at least one diaphragm blade or a shutter, and wherein the shutter unit is configured to control the amount of exposure on the image pickup device by switching the speed of the shutter according to the subject brightness.

* * * * *